Dec. 28, 1948           D. BROWN           2,457,526

FIRE HOSE NOZZLE

Filed Sept. 15, 1945

Inventor

DANIEL BROWN

By

Attorneys

Patented Dec. 28, 1948

2,457,526

UNITED STATES PATENT OFFICE 2,457,526

FIRE HOSE NOZZLE

Daniel Brown, Burlington, N. J.

Application September 15, 1945, Serial No. 616,637

3 Claims. (Cl. 299—136)

My invention relates to nozzles for fire hose and has for its object to provide means whereby a fog or spray of any desired density may be had.

A further object of this invention is to provide means whereby the density of a spray may be changed on the instant.

A further object of the invention is to provide an instantly changeable nozzle valve.

Other features and advantages will become more readily apparent from the following description and the accompanying illustrative drawings in which.

In the above drawings as well as in the specification to follow, the same characters of reference indicate the same parts throughout.

Figure 2:
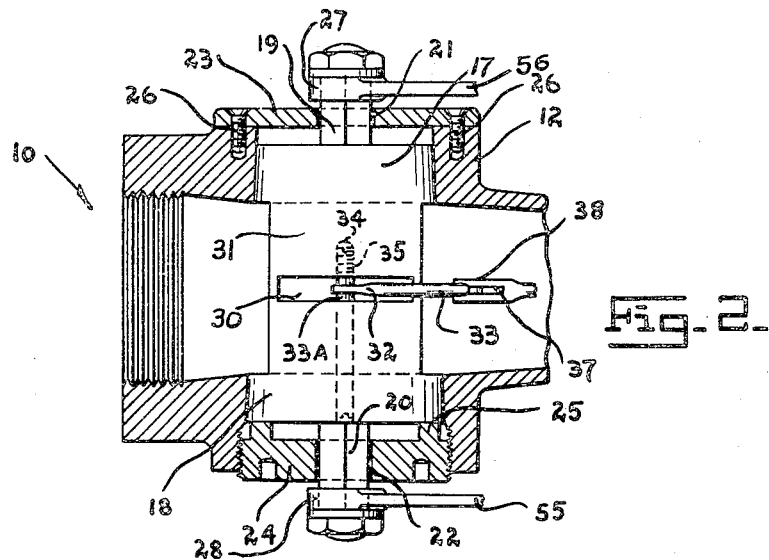
Figure 2 is a transverse section thereof, shown partly broken away.
Figure 1:
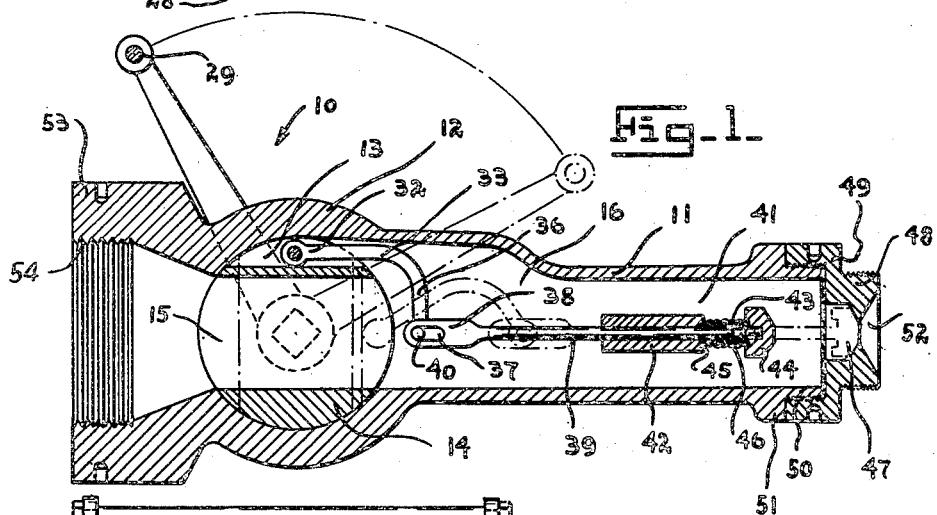
Figure 1 is a longitudinal vertical sectional view of a fire hose nozzle.
Figure 3:
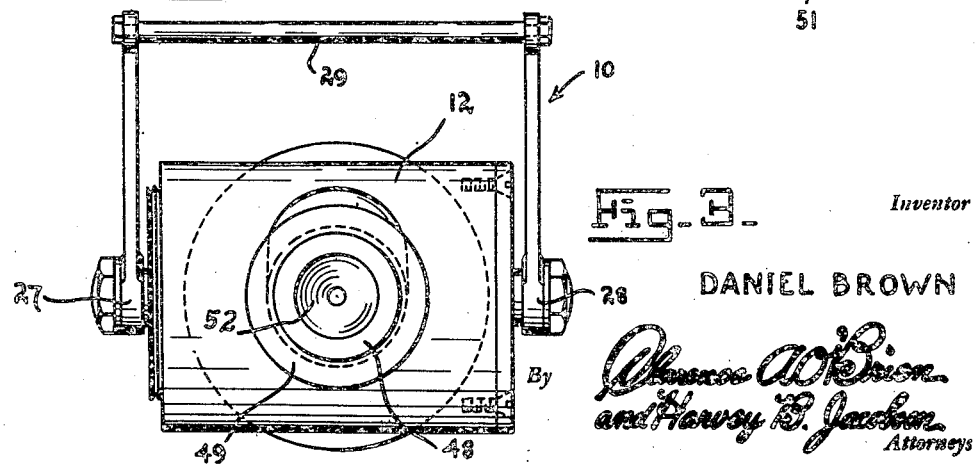
Figure 3 is an end view of the nozzle.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claims. And while I have stated the primary field of utility of my invention it remains obvious that it may be employed in any other capacity wherein it may be found applicable.

The invention 10 consists of a nozzle 11 provided with an inner enlargement 12, through which is a relatively large transverse bore 13 in which is seated a cylindrical plug 14 having a centrally disposed transverse passage 15 adapted to be aligned with the bore 16 of the nozzle, or which may cut off said bore by turning the plug. Projecting from the center of each end 17 and 18 of the tapered plug are rectangular pintles 19 and 20 operating through bores 21 and 22 in the caps 23 and 24, the latter being screw threaded into bore 13 and having a take-up flange 25 for spacing the plug 14. The cap 23 is secured in place by countersunk screws 26. Fixed on the outer terminals of the members 19 and 20 are the similarly apertured ends 27 and 28 of a yoke control handle 29 for the said plug 14.

The plug 14 is provided with an elongated slot 30 in its upper surface 31, within which slot operates an end 32 of a crank link 33 which is secured pivotally in place by means of a long pin 33A having a threaded end 34 (shown dotted) screwed into a threaded bore 35 in the plug. The right angular end 36 of the link 33 is secured in the slot 37 in the inner end 38 of a valve stem 39 by a pin 40 having plug in the slot.

Integrally formed on the inner wall 41 of the nozzle 11 is a guide 42 for the stem 39 being screwed on the outer end 43 of the stem is a valve 44, between which and the outer end 45 of the guide 42, a spring 46 is coiled normally holding the stem extended to the inner limit of the slot 37, and providing a limited amount of play for the valve when located in the valve seat 47 of the spray nozzle or adaptor 48 in the form of a cap 49, screwed upon the threaded reduced end 50 of the nozzle terminal 51. The nozzle 48 is provided with the usual flaring spray wall 52. The rear end 53 of the nozzle 11 is provided with a threaded bore 54 to receive a fire hose connection nipple (not shown).

From the foregoing description it will appear obvious that a spray of any desired density may be obtained by a fireman in a split second by movement of the lever handle 29, and that as the lever is moved far enough forward to change the spray into a fog, the water volume is simultaneously reduced. The exact desired action of the plug 14 may be obtained by adjusting the arms 55 and 56 of the said handle 29 on the pintles or shanks 19 and 20 of the plug 11.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention, that which I claim as new and desire to procure by Letters Patent is:

1. A fire hose nozzle comprising an elongated hollow nozzle body being internally threaded at its inner end and externally threaded at its outer end, said body being formed with a transversely extending bore forming spaced cylindrical tapered bearing seats, a plug valve formed with a transverse passage having enlarged spaced tapered bearing ends adapted to be rotatably supported in said bearing seats, removable cap members in the outer ends of said transverse bore, rectangular shaped pintles disposed axially on the ends of said plug valve extending through and beyond said cap members, a U-shaped valve operating yoke or handle secured to the outer ends of said pintles, a detachable spray nozzle having a valve seat on its inner end threadable on the outer end of said nozzle body, a guide supported interiorly of said hollow nozzle body upon the inner wall thereof formed with an axially extending bore, a valve stem slidably disposed in said axial bore, a valve on the outer end of said stem adapted to seat on said valve seat in said detachable spray nozzle, and a crank connected between said plug valve and said valve stem whereby the operation of said plug valve when opened and closed will cause a similar operation of the valve cooperating with the valve seat in said detachable spray nozzle.

2. A fire hose nozzle comprising an elongated hollow nozzle body being internally threaded at its inner end and externally threaded at its outer end, said body being formed with a transversely extending bore forming spaced cylindrical tapered bearing seats, a plug valve formed with a transverse passage having enlarged spaced tapered bearing ends adapted to be rotatably received and supported in said bearing seats, removable cap members in the outer ends of said transverse bore, rectangular shaped pintles disposed axially on the ends of said plug extending through and beyond said cap members, a U-shaped valve operating yoke or handle secured to the outer ends of said pintles, a detachable spray nozzle having a valve seat on its inner end threadable on the outer end of said nozzle body, a guide supported interiorly of said hollow nozzle body upon the inner wall thereof formed with an axially extending bore, a valve stem slidably disposed in said axial bore, a valve on the outer end of said stem adapted to seat on said valve seat in said detachable spray nozzle, resilient means disposed about said valve stem between said guide and the valve on the outer end of said stem for normally projecting the valve stem and attached valve to its forwardmost position, and a crank connected between said plug valve and said valve stem whereby the operation of said plug valve when opened and closed will cause a similar operation of the valve cooperating with the valve seat in said detachable spray nozzle.

3. A fire hose nozzle comprising an elongated hollow nozzle body being internally threaded at its inner end and externally threaded at its outer end, said body being formed with a transversely extending bore forming spaced cylindrical tapered bearing seats, a plug valve formed with a transverse passage having enlarged spaced bearing ends adapted to be rotatably supported in said bearing seats, removable cap members in the outer ends of said transverse bore, rectangular shaped pintles disposed axially on the ends of said plug valve extending through and beyond said cap members, a U-shaped valve operating yoke or handle secured to the outer ends of said pintles, said plug valve being formed with a slot in its surface extending parallel with its transverse passage, a pin mounted transversely of said slot, an arcuate crank having one end connected to said pin, a detachable spray nozzle having a valve seat on its inner end threadable on the outer end of said nozzle body, a guide supported interiorly of said hollow nozzle body upon the inner wall thereof formed with an axially extending bore, a valve stem slidably disposed in said axial bore, said valve stem being longitudinally slotted at its inner end to receive the forward end of said arcuate crank, a valve on the outer end of said stem adapted to seat on said valve seat in said detachable spray nozzle, and resilient means disposed about said valve stem between said guide and the valve on the outer end of said stem for normally projecting the valve stem and attached valve to its forwardmost position.

DANIEL BROWN.

REFERENCES CITED

The following references are of record in the file of this patent:

UNITED STATES PATENTS

| Number | Name | Date |
|---|---|---|
| 543,228 | Chavanne | July 23, 1895 |
| 930,444 | Warren | Aug. 10, 1909 |
| 975,469 | Shaw | Nov. 15, 1911 |
| 1,151,656 | Brown | Aug. 31, 1915 |
| 1,159,015 | Gibbs | Nov. 2, 1915 |
| 1,185,585 | Bower | May 30, 1916 |
| 1,380,950 | Fornwolf | June 7, 1921 |
| 1,578,758 | Reed | Mar. 30, 1926 |
| 1,743,370 | Messmer | Jan. 14, 1930 |
| 2,225,759 | Strout | Dec. 24, 1940 |
| 2,271,800 | Meussdorffer | Feb. 3, 1942 |